June 15, 1965    G. C. W. VAN OLPHEN    3,188,825
APPARATUS FOR FREEZE CONCENTRATION
Filed May 19, 1959    2 Sheets-Sheet 2
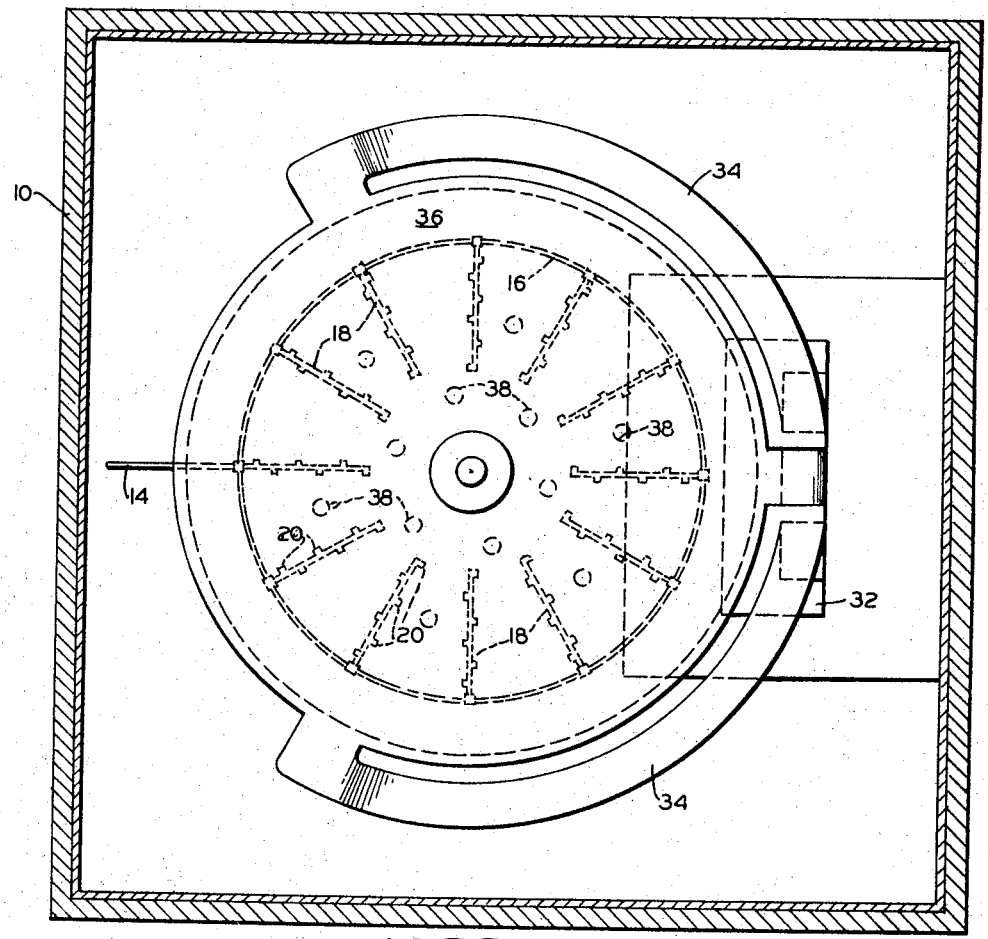
FIG_2
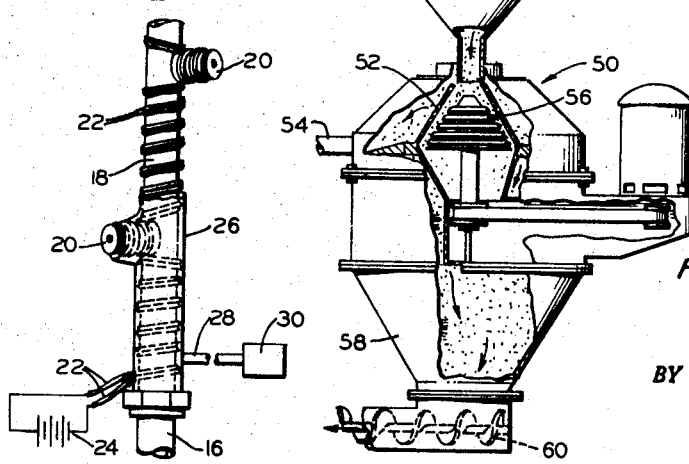
FIG_3    FIG_4
INVENTOR.
George C.W. van Olphen
BY Paul B. Fike
PATENT AGENT 3,188,825
APPARATUS FOR FREEZE CONCENTRATION
George C. W. van Olphen, 3151 Santa Maria,
Santa Clara, Calif.
Filed May 19, 1959, Ser. No. 814,316
2 Claims. (Cl. 62—123)

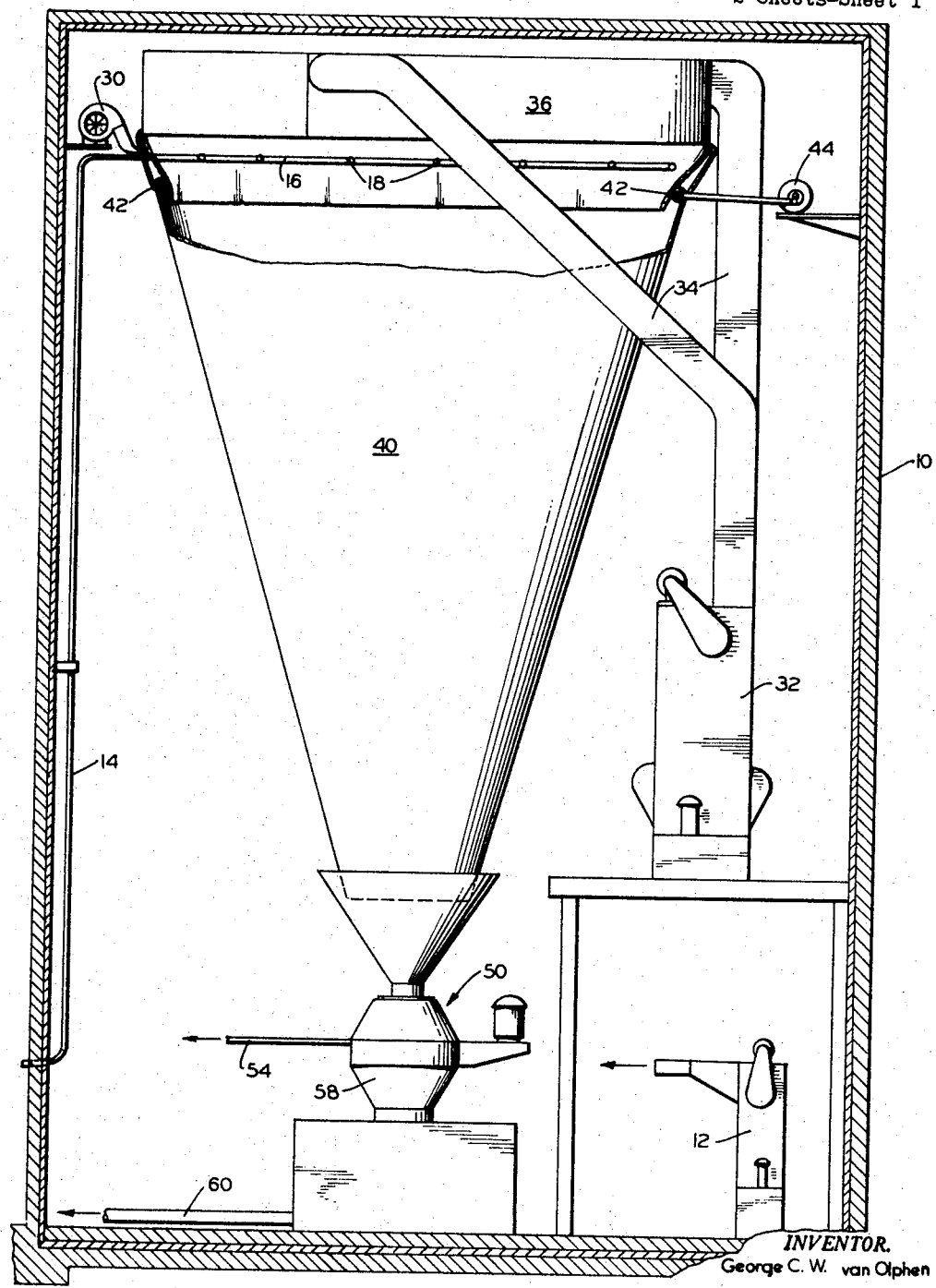
FIG_1

The present invention relates generally to chemical concentration processes and more particularly to an apparatus for freeze-concentration of solutions or suspensions through selective freezing of the solvent constituent thereof.

Freeze concentration methods have been proposed for various uses and especially for dehydration of heat-sensitive solutions and/or suspensions such as fruit juices and certain pharmaceuticals, since distillation or evaporation at elevated temperatures are detrimental to some characteristics or such substances, for example, the vitamin content and flavor of fruit juices. However, certain severe problems have been encountered with such methods, particularly when employed for high-capacity commercial use. As an example, it has proved difficult in commercial freeze dehydration operations to maintain a small ice particle size. Consequently, occlusion of the concentrate in the relatively large particles occurs to render the operation both inefficient and wasteful. Various mechanical agitation devices and multi-state operations have, in turn, been proposed to exert greater control on particle size but are expensive and not-too-effective expedients.

It is, accordingly, a general object of the present invention to provide freeze concentration apparatus that is, efficient in carrying out dehydration or other concentration of solutions or suspensions, is not wasteful of the concentrate product, and can be applied with simple apparatus for high-capacity, commercial utilization.

It is a feature of the invention to provide a freeze concentration apparatus wherein the solution is initially atomized into a fine mist consisting of small liquid particles so that a large surface area is presented to enable optimum heat-transfer between the freezing medium and the solution.

A correlated feature is the provision of cold-blown air or other gaseous coolant as the freezing medium wherefore not only is close intermixture with the small mist particles produced to result in the mentioned effectiveness of heat transfer but the turbulence of the air flow also creates particle agitation in a manner which maintains the small size of the particles, precludes their agglomeration, and avoids occlusion of the concentrate in the solvent upon its reaching the frozen, solid state.

It is an additional feature of the invention to provide a freeze concentration apparatus wherein the fine mist is established in a substantially enclosed chamber and a gaseous coolant is blown in a predetermined direction therethrough so as to function not only as the freezing medium but also as a conveyor for the liquid and solid particles wherefore subsequent collection and separation of the liquid from the solid is facilitated.

A further feature is the provision of effective separation of the solid particles from the liquid concentrate through a centrifugal filtration step whereby continuous and effective separation is accomplished.

An additional feature of the invention is the optional inclusion of a recycling process whereby a portion of the liquid concentrate is mixed in predetermined proportion with the unprocessed solution prior to the freezing operation so that ultimately a high concentration of the concentrate can be achieved without necessity for employment of a plurality of stages of operation.

Additionally, it is another feature of the invention to provide an apparatus for carrying out the improved apparatus in an effective, continuous manner wherefore large scale commercial production can be achieved.

A feature relating directly to such apparatus is the provision of a series of spray-manifold nozzles arranged to provide for an even distribution of the mist and constructed to preclude clogging with the ice or other frozen solvent.

A further feature is the provision of a flexible plastic conduit within which the mist is formed and frozen and an arrangement for vibrating such conduit wherefore no accumulation of solid particles thereon can occur.

These as well as additional objects and features of the invention will become more apparent from a perusal of the following description of the apparatus embodying the present invention and an exemplary form of apparatus for carrying out the same in commercial production.

In its most general aspects, the apparatus embodying the present invention includes the apparatus of atomizing the liquid solution or suspension to a fine mist, and thereafter passing a coolant through such mist in a manner to achieve a thorough intermixture thereof. The coolant is at a sufficiently low temperature that one constituent, normally the solvent, of the solution will freeze wherefore a mixture of solid and liquid particles are formed. Thereafter, the mixture of solid and liquid particles are separated, and the liquid effluent normally constitutes the concentrate product.

The details of a practical application of the apparatus will more readily be understood by reference to a particular concentration process, that of the continuous dehydration of orange juice. It will be understood that such detailed explanation is purely exemplary, and its applicability to other solutions and/or suspensions will be obvious.

Initially, the orange juice is preferably precooled to a temperature slightly above the freezing point of water, that is 32° F., to thus enable the actual freezing of the subsequently formed particles to occur rapidly and enable application of the apparatus to large-scale commercial production.

The precooled juice is thereafter atomized into a fine mist form, preferably by spraying the same into a substantially enclosed chamber in a manner to achieve even distribution of the liquid particles in the upper portion thereof. The particles are delivered into the chamber with a substantial horizontal or transverse component of motion and preferably with a median particle size of approximately 50 microns.

Gaseous coolant in the form of air is continuously blown downwardly from the top of the chamber so as to engage the liquid particles and urge the same downwardly toward the bottom of the chamber where they are subsequently collected as will be described hereinafter. The air temperature is preferably between 0° and 16° F. dependent upon the initial concentration and sugar content of the raw juice. Since, as will be apparent from the described small size of the particles, a large surface area is exposed to the air, excellent heat transfer is afforded and rapid freezing of the solvent water particles occurs. Since the juice has been precooled to substantially freezing temperature, little more than the heat of fusion is necessary to convert the water to ice. The air flow is turbulent so that continuous agitation of the particles is achieved to maintain their small size and preclude agglomeration. Since the particles are thus maintained at their small size, substantially no occlusion of the juice (solute) within the freezing water (solvent) particles occurs. As a consequent, the downwardly moving air selectively freezes the water into small micro-crystals of clear ice and delivers the same together with the droplets of juice concentrate to the bottom portion of the chamber.

The mixture of ice particles and juice concentrate is collected as a slurry which is then separated by filtration. Preferably, such filtration is performed continuously and rapidly with the ultilization of centrifugal force.

It will be apparent that the amount of concentration achieved by the described steps will depend upon several factors and can most easily be changed through varying the amount and temperature of the air. It has been determined as a practical matter that optimum effectiveness of the method is obtained if the concentration of the orange juice is approximately doubled. Under such conditions, a negligible amount of the juice concentrate is removed with the ice particles wherefore substantially 100% recovery of the juice results. In view of the fact that frozen orange juice is commercially distributed with a quadruple concentration, two stages of operation of the apparatus are requisite to obtain such desired degree of concentration.

However, in accordance with an additional aspect of the present invention, a recycling step can be utilized optionally to avoid the necessity for two separate stages of concentration. Generally, such additional step entails the removal of a portion of the liquid concentrate and the subsequent mixing of such concentrate with the incoming supply of raw juice in predetermined proportion and recycling this mixture through the described steps so that the withdrawn product is concentrated to the desired amount, in the case of orange juice, four times that of the raw juice. If it is assumed that the initial concentration of the raw juice is 10% and a final concentration of 40% is thus desired, one quart of the 40% concentrate is mixed with each 2 quarts of the raw juice of 10% concentration to result in a mixture having a concentration of 20% which then undergoes the recited steps of the apparatus. In undergoing such steps, the concentration is doubled, as is desired for optimum operation of the apparatus; wherefore, approximately one half of the mixture is removed as ice, and the other half, being one and one half quarts, is removed as juice concentrate. In turn, one quart of this concentrate is mixed and recycled with two quarts of the raw juice for recycling therewith, while one half quart is withdrawn as the concentrate product. In this manner, the optimum concentration conditions of the apparatus are maintained, but the withdrawn product has a concentration quadruple that of the raw juice, as is desired.

Practical application of the described apparatus for commercial purposes can be achieved by utilization of apparatus embodying certain additional features of the present invention and illustrated in the accompanying drawings wherein:

FIG. 1 is a fragmentary elevational view of a process room with exemplary apparatus for carrying out the invention, FIG. 2 is a fragmentary, plan view of the structure illustrated in FIG. 1, FIG. 3 is a fragmentary, bottom plan view of a juice spray manifold, and FIG. 4 is a fragmentary elevation, of a screening centrifuge with parts broken away to illustrate interior details of its construction, and its manner of liquid and solid separation.

The installation illustrated in the drawings is designed to enable the processing of the juice from approximately 10 tons of oranges per hour. To house apparatus of the requisite capacity, a sealed process room having walls 10 approximately forty-five feet high and twenty-eight feet long is provided. The air in such process room is dehumidified by continuous recirculation through a suitable air conditioning unit, such as a spray cooler 12 manufactured by Niagara Blower Company.

The raw juice, having been precooled to approximately 32° F. or slightly thereabove in any suitable fashion forming no part of the present invention, is delivered to the process room under pressure of 100 pounds per square inch at a rate of 12 gallons per minute through a suitable 1½ inch pipe 14, which is preferably provided with an insulated exterior. The pipe 14 is connected to a circular manifold 16 twenty feet in diameter that is supported adjacent the top of the process room and, in turn, establishes connection with twelve spray manifolds 18 which extend radially inwardly therefrom, as best illustrated in FIG. 2. Six atomizing spray nozzles 20, such as the W series Bete fog nozzles, are connected to each spray manifold 18 in alternate, staggered relation to extend outwardly and downwardly therefrom, as more clearly illustrated in FIG. 3. Each of these nozzles 20 is capable of spraying approximately 10 gallons of liquid per hour when the liquid is delivered thereto under the mentioned pressure of 100 pounds per square inch and forms a spray whose median particle size is between 40 and 50 microns.

With continued reference to FIG. 3, small heater wires 22 are connected to a suitable source of current, diagrammatically indicated at 24, and are wrapped around the nozzles 20 to enable heating thereof and removal of any accumulated ice which might otherwise clog the nozzles and interrupt the spray operation. Additionally, an expansible, resilient sleeve 26 is disposed around each of the spray manifolds 18 in sealing relationship thereover and is connected by tubing 28 to a suitable source of compressed air, indicated at 30, so that such sleeves 26 can be alternately inflated and deflated to remove accumulated ice from the manifolds themselves.

In order to provide for the flow of gaseous coolant into freezing contact with the sprayed juice, an air chiller 32, such as Model 8100, also manufactured by Niagara Blower Company, is installed within the process room and is provided with outlet ducts 34 which deliver air at a temperature between 0° and 16° F. and at a rate of 2500 cubic feet per minute to a hood 36 disposed immediately above the spray manifolds 18. Appropriately spaced openings 38 (see FIG. 2) deliver the cold air downwardly from the hood 36 into turbulent contact with the liquid spray particles in order to instigate the described freeze concentration step.

In order to confine the mixed air and juice particles and deliver the same to a screening centrifuge to be described hereinafter, a generally funnel-shaped conduit 40 is formed by polyethylene, or other flexible material, that is suspended at its upper extremity by a metallic ring 42. Since certain plastic materials, such as polyethylene, are substantially impervious to water and other liquids, there is substantially no adherence and accumulation of liquid or frozen particles on the conduit 40. However, to further assure that no such accumulation will occur to interrupt the continuous flow of air, and ice particles downwardly within the funnel-shaped conduit 40, a continuous slight vibration is imparted to the conduit-supporting ring 42 by a suitable eccentric mechanism, indicated at 44, wherefore continuous vibration of the entire flexible conduit is experienced.

As the mixture of cold air and juice particles move downwardly through the plastic conduit 40, the water is selectively frozen into small microcrystals of ice which then are exhausted from the conduit in mixture with the juice concentrate and the air.

This mixture or slurry is delivered into a screening centrifuge 50 as best shown in FIG. 4. The Mercone screening centrifuge manufactured by Door-Oliver, Inc., has been found particularly effective for the separation of the ice particles from the juice concentrate. The entering slurry moves downwardly into the centrifuge 50 where it is brought up to speed and urged outwardly against the surface of a screen 52. The orifices in the screen 52 are sufficiently small to preclude passage of the particles of ice therethrough, but readily pass the liquid concentrate which is then delivered outwardly to an exhaust conduit, indicated at 54. The accumulated particles of ice actually serve to enhance the filtering action obtainable in the centrifuge 50 through their build up against the interior of the screen 52. The solid particles of ice as they accumulate are moved down inside the screen by a rotating helix 56 which eventually forces such solids into an underlying hopper 58 from whence the particles are removed by any suitable means, such as a screw conveyor 60. If desired, such ice particles can be utilized in a heat-exchange mechanism (not shown) to provide for the initial precooling of the raw juice. The juice concentrate, being now at approximately twice the initial concentration of the raw juice, can be put through an additional stage of operation or can be recycled in the manner previously described wherefore the final juice concentrate is four times the concentration of the raw juice.

Obviously, many modifications and/or alterations can be made in the described apparatus without departing from the spirit of the invention. Accordingly, the foregoing description is to be considered as exemplary and not in a limiting sense and the scope of the invention is to be indicated by reference to the appended claims.

What is claimed is:

1. Apparatus for concentrating solutions which comprises a generally vertically disposed conduit composed of flexible, liquid-impervious plastic material, means for continuously vibrating said plastic conduit, means for spraying the solution into the upper portion of said conduit, means for blowing cold air downwardly through said conduit to intermix with the sprayed solution and freeze portions thereof, and means for collecting and separating the liquid and solid portions of the solution.

2. Apparatus for concentrating solutions which comprises a generally vertically disposed conduit, means for spraying the solution into the upper portion of said conduit, said solution spraying means including a spray manifold having a plurality of spray nozzles arranged in downwardly and outwardly inclined directions, an expansible sleeve on said manifold, means for alternatively expanding and contracting said sleeve, means for blowing cold air downwardly through said conduit to intermix with the sprayed solution and freeze portions thereof, and means for collecting and separating the liquid in solid portions of the solution.

References Cited by the Examiner

UNITED STATES PATENTS

| | | | |
|---|---|---|---|
| 1,221,054 | 4/17 | Hyatt | 62—347 X |
| 1,748,043 | 2/30 | Grupe. | |
| 1,755,810 | 4/30 | Carney. | |
| 1,878,759 | 9/32 | Copeman. | |
| 1,966,150 | 7/34 | Tamm | 62—347 X |
| 1,970,437 | 8/34 | Snitkin | 62—347 X |
| 2,436,218 | 2/48 | Malcolm. | |
| 2,522,651 | 9/50 | Van Vleck | 62—345 X |
| 2,552,523 | 5/51 | Cunningham | 62—58 |
| 3,024,117 | 3/62 | Barlow | 62—74 X |
| 3,121,626 | 2/64 | Zarchin | 62—58 |

FOREIGN PATENTS 102,539  9/41  Sweden.

NORMAN YUDKOFF, *Primary Examiner.*

ROBERT A. O'LEARY, *Examiner.*